United States Patent
Khader et al.

(10) Patent No.: US 11,458,457 B2
(45) Date of Patent: Oct. 4, 2022

(54) PALLADIUM CATALYST FOR OXIDATION OF METHANE AND METHOD OF PREPARATION AND USE THEREOF

(71) Applicant: QATAR UNIVERSITY, Doha (QA)

(72) Inventors: Mahmoud M. Khader, Doha (QA); Mohammed J. Al-Marri, Doha (QA); Sardar Ali, Doha (QA); Ahmed Gamal Abdelmoneim, Doha (QA); Anand Kumar, Doha (QA)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 15/576,208

(22) PCT Filed: Nov. 23, 2016

(86) PCT No.: PCT/IB2016/057080
§ 371 (c)(1),
(2) Date: Nov. 21, 2017

(87) PCT Pub. No.: WO2018/096385
PCT Pub. Date: May 31, 2018

(65) Prior Publication Data
US 2018/0369787 A1 Dec. 27, 2018

(51) Int. Cl.
*B01J 23/10* (2006.01)
*B01D 53/94* (2006.01)
(Continued)

(52) U.S. Cl.
CPC ............ *B01J 23/10* (2013.01); *B01D 53/864* (2013.01); *B01D 53/8671* (2013.01); *B01D 53/94* (2013.01); *B01D 53/944* (2013.01); *B01J 21/04* (2013.01); *B01J 23/44* (2013.01); *B01J 23/63* (2013.01); *B01J 35/002* (2013.01); *B01J 35/1014* (2013.01); *B01J 35/1019* (2013.01); *B01J 35/1023* (2013.01); *B01J 35/1028* (2013.01); *B01J 37/08* (2013.01); *B01J 37/088* (2013.01); *B01J 37/16* (2013.01); *F01N 3/103* (2013.01); *B01D 2255/1023* (2013.01);
(Continued)

(58) Field of Classification Search
USPC ........................................................ 423/245.3
See application file for complete search history.

(56) References Cited

FOREIGN PATENT DOCUMENTS

| CN | 102441404 A | 5/2012 |
|---|---|---|
| CN | 103191733 A | 7/2013 |
| KR | 20010008730 A | 2/2001 |

OTHER PUBLICATIONS

Encyclopedia Britannica, Nanoparticle; https://www.britannica.com/science/nanoparticle (Year: 2019).*

(Continued)

*Primary Examiner* — Anita Nassiri-Motlagh
(74) *Attorney, Agent, or Firm* — Squire Patton Boggs (US) LLP

(57) ABSTRACT

This invention relates to a novel palladium catalyst for the substantially complete oxidative removal of methane from exhaust streams at low operating temperatures compared to other current palladium catalysts and to methods of preparing the catalyst. Use of the catalyst to remove methane from vehicle exhaust streams, crude oil production and processing exhaust streams, petroleum refining exhaust streams and natural gas production and processing exhaust streams.

4 Claims, 8 Drawing Sheets

(51) Int. Cl.
  *B01J 35/00* (2006.01)
  *B01J 21/04* (2006.01)
  *B01J 23/44* (2006.01)
  *B01J 35/10* (2006.01)
  *B01D 53/86* (2006.01)
  *B01J 37/16* (2006.01)
  *B01J 23/63* (2006.01)
  *B01J 37/08* (2006.01)
  *F01N 3/10* (2006.01)

(52) U.S. Cl.
  CPC ............ *B01D 2255/2065* (2013.01); *B01D 2255/2092* (2013.01); *B01D 2255/9207* (2013.01); *B01D 2257/7025* (2013.01); *F01N 2570/12* (2013.01)

(56) References Cited

OTHER PUBLICATIONS

Klingstedt et al., "Hydrothermally Stable Catalysts for Removal of Emissions from Small-scale Biofuel Combustion Systems", React. Kinet. Catal. Lett., 70 (2000). (Year: 2000).*
International Search Report and the Written Opinion of the International Searching Authority, or the Declaration, dated Mar. 17, 2017 for PCT/IB16/57080, 9 pages.
Aznárez, A., et al: "The promoting effect of cerium on the characteristics and catalytic performance of palladium supported on alumina pillared clays for the combustion of propene", Oct. 1, 2013, Applied Catalysis A: General, vol. 474, pp. 95-99.
Bi, Y., et al: "Catalytic CO oxidation over palladium supported NaZSM-5 catalysts", 2003 Applied Catalysis B: Environmental, vol. 41, No. 3, pp. 279-286.
Brun, M., et al: "XPS, AES and Auger parameter of Pd and PdO" 1999, Journal of Electron Spectroscopy and Related Phenomena, vol. 104, Nos. 1-3, pp. 55-60.
Colussi, Sara, et al: "Catalytic performance of solution combustion synthesized alumina- and ceria-supported Pt and Pd Nanoparticles for the combustion of propane and dimethyl ether (DME)", Industrial & Engineering Chemistry Research, Jan. 10, 2012, vol. 51, No. 22, pp. 7510-7517.
Colussi, Sara, et al: "Influence of Different Palladium Precursors on the Properties of Solution-Combustion-synthesized Palladium/Ceria Catalysts for Methane Combustion", Jun. 2015, Chem Cat Chem, vol. 7, No. 14, pp. 2222-2229.
Colussi, Sara, et al: "Nanofaceted Pd—O Sites in Pd—Ce Surface Superstructures: Enhanced activity in catalytic combustion of methane", Agnew Chem Ind Ed 2009, vol. 48, pp. 8481-8484.
Gelin, Patrick, et al: "Complete oxidation of methane at low temperature over noble metal based catalysts: a review", Applied Catalysis B: Environmental 2002, vol. 39, No. 1, pp. 1-37.
Huang, Haibao, et al: "Mechanistic study on formaldehyde removal over Pd/TiO2 catalysts: Oxygen transfer and role of water vapor", Jun. 26, 2013, Chemical Engineering Journal, vol. 230, pp. 73-79.

Ihm, S.-K., et al: "Low-temperature deactivation and oxidation state of Pd/γ-Al2O3 catalysts for total oxidation of n-hexane". Catalysis Today, Sep. 2004, vols. 93-95, pp. 149-154.
Mistri, R., et al: "Liquid phase selective oxidation of benzene over nanostructured CuxCe1—xO2-δ (0.03≤x≤0.15)", Mar. 2014, Journal of Molecular Catalysis A: Chemical, vol. 390, pp. 187-197.
Pillo, Th, et al: "The electronic structure of PdO found by photoemission (UPS and XPS) and inverse photoemission (BIS)", 1997, Journal of Physics: Condensed Matter, vol. 9, No. 19, pp. 3987-3999.
Priolkar, K. R., et al: "Formation of Ce1—xPdxO2-δ Solid Solution in Combustion-Synthesized Pd/CeO2 Catalyst: XRD, XPS, and EXAFS Investigation", Apr. 2002, Chemistry of Materials, vol. 14, No. 5, pp. 2120-2128.
Scanlon, David. O., et al: "The origin of the enhanced oxygen storage capacity of Ce1—x(Pd/Pt)xO2", Mar. 2011, Physical Chemistry Chemical Physics, vol. 13, No. 10, pp. 4279-4284.
Shinde, V. M., et al: "Kinetic studies of ionic substituted copper catalysts for catalytic hydrogen combustion", Dec. 2012 Catalysis Today, vol. 198., No. 1, pp. 270-279.
Specchia, Stefania, et al: "Surface chemistry and reactivity of ceria-zirconia-supported palladium oxide catalysts for natural gas combustion", Feb. 2009, Journal of Catalysis, vol. 263, No. 1, pp. 134-145.
K. Bakhmutsky et al., "A Versatile Route to Core-Shell Catalysts: Synthesis of Dispersible M@Oxide (M=Pd, Pt; Oxide=TiO2, ZrO2) Nanostructures by Self Assembly", Chemsuschem, DOI:10.1002/cssc.201100491, 9 pages.
M. Cargnello et al., Exceptional Activity for Methane Combustion Over Modular Pd@CeO2 Subunits on Functional Al2O3, Science 337, 713 (2012); DOI: 10.1126/science.1222887, 6 pages.
C. Chen et al., "Methane Oxidation on Pd@ZrO2/Si—Al2O3 Is Enhanced by Surface Reduction of ZrO2", ACS Catalysis, Research Article, pubs.acs.org/acscatalysis, ACS Catal. 2014, 4, 3902-3909, dx.doi.org/10.1021/cs501146u, 8 pages.
L. Xiao et al., "Low-temperature Catalytic Combustion of Methane Over Pd/CeO2 prepared by Deposition Precipitation Method", Science Direct, Catalysis Communications 6 (2005) 796-801, www.elsevier.com/locate/catacom, available online at www.sciencedirect.com, doi:10.1016/j.catcom.2005.07.015, 6 pages.
S. Colussi et al., "The Effect of CeO2 on the Dynamics of Pd PdO Transformation over Pd/Al2O3 combustion Catalysts", Catalysis Communications 8 (2007) 1263-1266, www.elsevier.com/locate/catcom, available online at www.sciencedirect.com, doi:10.1016/j.catcom.2006.11.020, 4 pages.
A. Mayernick et al., "Methane Oxidation on Pd Ceria: A DFT Study of the Mechanism Over PdxCe1−xO2, Pd, and PdO", Journal of Catalysis 278 (2011) 16-25, www.elsevier.com/locate/jcat, doi:10.1016/j.cat.2010.11.006, 12 pages.
A. Vita et al., "Syngas Production by Methane Oxy-Steam Reforming on Me/CeO2 (Me=Rh, Pt, Ni) Catalyst Lined on Cordierite Monoliths", Applied Catalysis B: Environmental 162 (2015) 551-563, www.elsevier.com/locate/apcatb, http://dx.doi.org/10.1016/j.apcatb.2014.07.028, 13 pages.

* cited by examiner

PALLADIUM CATALYST FOR OXIDATION OF METHANE AND METHOD OF PREPARATION AND USE THEREOF

FIELD

This invention is directed to the preparation of a novel palladium catalyst for the oxidation of methane particularly methane in gaseous effluents destined for release into the atmosphere and for a one-pot synthesis of the catalyst.

BACKGROUND

Methane, along with water vapor, carbon dioxide, nitrous oxide and ozone comprise the greenhouse gases that result from natural sources and human activity. Methane ranks second only to carbon dioxide in quantity emitted by all sources; that is, carbon dioxide constitutes about 80% and methane 10% of all greenhouse gases. Methane has a much shorter lifetime than carbon dioxide in the atmosphere, approximately 12 years compared to a poorly defined lifetime estimated to be in the hundreds to potentially even thousands of years for atmospheric carbon dioxide. Methane, however, is much more efficient than carbon dioxide as a radiation trap; that is, pound for pound, the effect of methane on climate change is over 25 times greater than that of carbon dioxide over a 100-year period and an estimated 86 times more potent than carbon dioxide over 20 years. Coupled with the fact that over ⅓ of the methane discharged into the atmosphere comes from the production, processing, storage, transmission and distribution of natural gas and the production, refinement, transportation and storage of crude oil, the control of methane emission into the atmosphere has for quite some time been a priority item in the battle against climate change.

The traditional method of removing methane from gas and oil production systems is flaring, the ignition of methane gas at the point of release to the atmosphere. While somewhat effective, flaring is not without its own environmental concerns; for example, incomplete combustion that results in considerable methane still being released into the atmosphere and the production of black carbon, itself a potent contributor to climate change.

Much more desirable than flaring is the use of heterogeneous methane-oxidation catalysts that are highly efficient at removing even trace amounts of methane from exhaust streams. Catalysts based on noble metals such as platinum (Pt), palladium (Pd), rhodium (Rh) and iridium (Ir) have been shown to be quite effective for removing methane from exhaust streams. Of these, Pd-based catalysts have been found to exhibit the highest level of catalytic activity. The effects of the materials on which the Pd species are supported were extensively studied and it was concluded that the activity of Pd-based catalysts in methane oxidation depends on the redox properties of the support and the nature of interaction of Pd species with the support. Oxygen exchange with the support during methane oxidation also plays a key role in the mechanism of the reaction, especially at low reaction temperatures where adsorption of water on the support was observed to suppress reaction rate.

Generally, current Pd-based catalysts tend to exhibit acceptable activity at low temperatures or at high temperatures but not at both. That is, with regard to low temperature applications, Pd-based catalysts supported on alumina ($Al_2O_3$) or zirconia ($ZrO_2$) have been shown to possess high catalytic activity. At operating temperatures above 600° C., however, the catalyst is deactivated due to sintering and phase transition of Pd species to metallic $Pd^0$. On the contrary, ultra-stable Pd-based catalysts have been prepared by the reaction of $PdO_x$ species with rare-earth oxides such as $La_2O_3$, $Pr_2O_3$ and $CeO_2$. These catalysts suppress the decomposition of PdO to $Pd^0$ and thus maintain their activity at high temperatures. On the other hand, the catalytic activity of these systems at low temperatures, for example below 400° C. has been shown to be lacking.

Recently, the activity of a uniquely structured Pd-based core-shell catalyst was found to be 50 times higher than the activity of ceria ($CeO_2$)-supported Pd-based catalysts. Core-shell structures enhance the Pd-support interface and thus enhance catalytic activity. The development of these core-shell catalysts under dry-feed conditions satisfied the need for catalysts with low temperature activity coupled with high temperature stability. The presence of water in the feed however, was shown to deactivate the catalyst. FTIR data indicated that deactivation is due to formation of stable hydroxyl groups on the surface of the ceria nanoparticles. The hydroxyl groups have been suggested to significantly inhibit oxygen spillover from the $CeO_2$ nanoparticles to Pd, thereby preventing efficient re-oxidation of the Pd.

The preparation of core-shell catalysts involves several complicated inorganic chemistry steps and requires the use of numerous expensive chemicals. For example, a typical synthetic procedure for the preparation of Pd@$CeO_2$ core-shell units is based on the self-assembly of functionalized $Pd^0$ nanoparticles protected by 11-mercapto-undecanoic acid and a Ce(IV) alkoxide. Controlled hydrolysis of the resulting assembled units in the presence of dodecanoic acid leads to the formation of the Pd@$CeO_2$ structures dispersed in tetrahydrofuran. The core-shell structures are subsequently dispersed over precalcined $Al_2O_3$ modified with 10% $SiO_2$.

Chinese patent CN 102441404 discloses a honeycomb ceramic as the support for the catalytic metal. The surface of the ceramic was coated with a complex mixture comprising 40-85 wt % $Al_2O_3$, 5-50 wt % $TiO_2$, 5-15 wt % $CeO_2$, 2-10 wt % $La_2O_3$ and 3-15 wt % of one or more of CuO, $MnO_2$, NiO and $Fe_2O_3$. The coating was then loaded with Pt or Pt/Pd (1:1 to 3:1).

Somewhat similarly, Chinese patent CN 103191733 discloses a catalyst comprising $Al_2O_3$ as a primary support for a Pd-based catalyst with one or more of Pt, Rh, Ru and Ir added as secondary active components. One or more metal oxides selected from the group consisting of $CeO_2$, $ZrO_2$, $La_2O_3$ and $TiO_2$ were also added as promoters. All of these components were then supported on a honeycomb ceramic to create the final catalyst. This catalyst was reported to exhibit high activity coupled with good stability to water, even at relatively high temperatures. The synthetic procedure, however, is complex and costly, the use of numerous expensive metals and metal oxides being required.

Korean patent 2001-0008730 discloses a process for preparing a Pd-based catalyst wherein $Al_2O_3$ (25-50 mol %) was doped with 1-10 mol % $La_2O_3$ using the well-known incipient wetness impregnation procedure followed by coating with 50-75 wt % Pd. This catalyst was reported to be stable under dry-feed conditions but nothing was said about its activity under wet-feed conditions. Further, the use of substantial quantities of Pd renders this catalyst prohibitively expensive for a broad spectrum of uses.

Colussi, et al., Angew. Chem., Int. Ed., 2009, 48:8481-8484, discloses comparison of a ceria-supported Pd-based catalyst prepared by the incipient wetness impregnation (IWI) procedure and a compositionally identical catalyst prepared by a one-pot solution combustion synthesis (SCS)

process. Catalytic activity for propane and dimethyl ether combustion was examined and it was determined that the SCS catalyst was markedly more active than the IWI catalyst. This result was attributed to the coexistence of highly active PdO and nanosized $Pd^0$ particles that were formed during the SCS procedure. The light-off temperature with the SCS catalyst was 525-545 K compared to 555-585 K with the IWI catalyst. Full conversion with the SCS catalyst was achieved at 100 K lower than with the IWI catalyst.

Problems with current methane combustion catalysts include (1) expense; (2) physical/chemical complexity; (3) lack of high levels of activity at low temperatures; (4) lack of stability and maintenance of the high level of activity at high temperatures; and (5) deactivation by water in the exhaust stream. The Pd-based catalyst of this invention addresses and solves each of these problems.

SUMMARY

Thus in one aspect, this invention relates to a catalyst for methane oxidation, comprising:
nanoparticulate palladium species;
non-hierarchical ceria; and
non-hierarchical alumina;
  wherein the catalyst is characterized by:
  light-off at approximately 200° C.;
  stability up to at least 800° C.
  consistent catalytic activity to at least 800° C.; and
  consistent catalytic activity for exhaust streams containing up to 15 wt % water to at least 800° C.

In an aspect of this invention, the catalyst comprises 0.5 to 5 wt % nanoparticulate palladium species and 0.5 to 5 wt % ceria, both based on the quantity of alumina present.

In an aspect of this invention, the catalyst comprises 5 wt % nanoparticulate palladium species and 5 wt % ceria, both based on the quantity of alumina present.

In an aspect of this invention, the catalyst has a BET surface area of at least 88 $m^2/g$.

In an aspect of this invention, the catalyst is prepared by solution combustion synthesis.

In an aspect of this invention, the solution combustion synthesis comprises:
preparing a solution of a water-soluble palladium salt, a water soluble cerium salt, a water soluble aluminum salt and a reductant in distilled water;
applying external heat to the solution until self-sustained combustion is initiated;
removing the external heat source and permitting the self-sustained combustion to proceed to completion to provide a powder product; and
calcining the powder product in air at 800° C. for three hours.

In an aspect of this invention, the water soluble palladium salt is palladium nitrate trihydrate; the water-soluble cerium salt is cerium nitrate hexahydrate, the water-soluble aluminum salt is aluminum nitrate nonahydrate; and the reductant is glycine.

An aspect of this invention is a method of oxidatively removing methane from an exhaust stream comprising passing the exhaust stream over the catalyst hereof at a temperature of 200° C. to 800° C.

In an aspect of this invention, the temperature is 200° C. to 430° C.

In an aspect of this invention, the exhaust stream comprises up to 15% water vapor.

In an aspect of this invention, the oxidative removal of methane is substantially complete.

In an aspect of this invention, the catalyst is activated prior to being used to catalyze the oxidation of methane in an exhaust stream by passing an oxygen/argon stream over the catalyst for a selected period of time at a selected temperature.

In an aspect of this invention, the oxygen/argon stream comprises 5% oxygen in argon, which is passed over the catalyst at 30 ml/min, the selected temperature is 500° C., which is reached by heating the system at 10 K/min and then the selected time period is 30 minutes at 500° C.

In an aspect of this invention, the exhaust stream is selected from the group consisting of motor vehicle exhaust, crude oil production and processing exhaust; petroleum refining exhaust; and natural gas production and processing exhaust.

DETAILED DESCRIPTION

DISCUSSION

Figure 1:
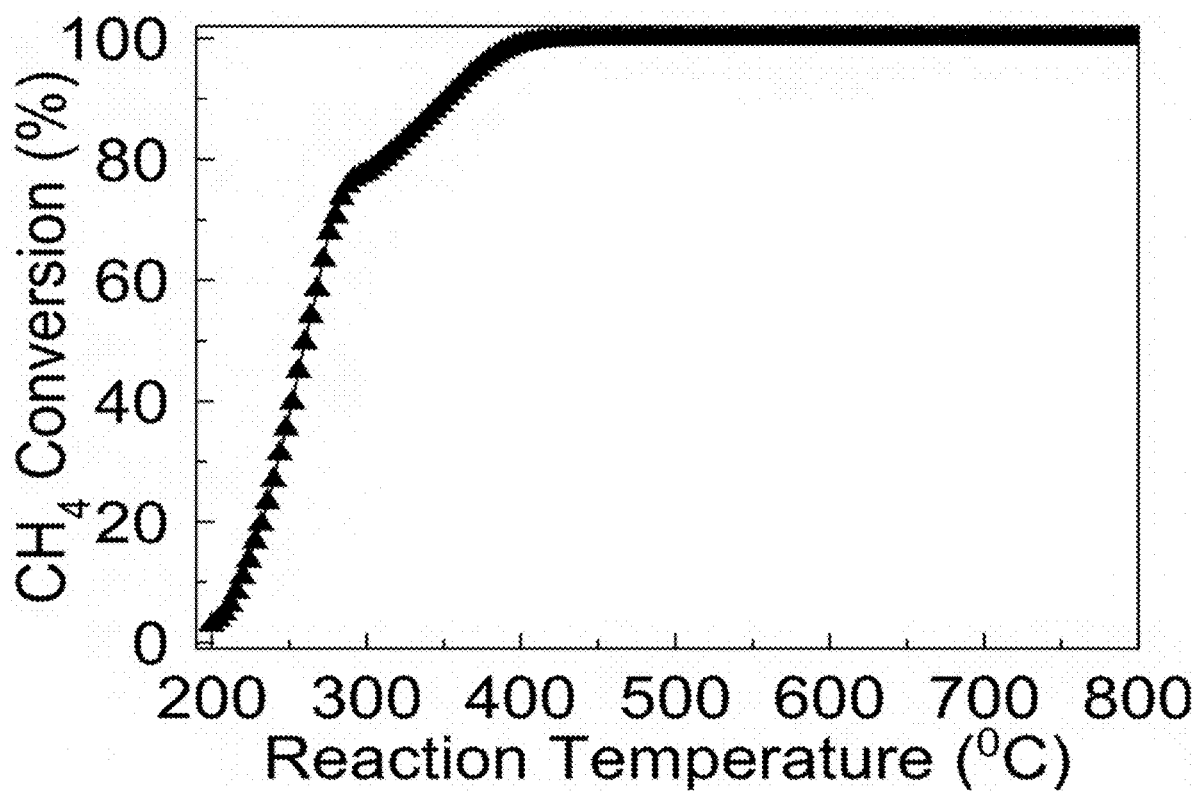
FIG. 1 shows a graph of the percent conversion of methane versus reaction temperature using a catalyst of this invention.

It is understood that, with regard to this description and the appended claims, any reference to any aspect of this invention made in the singular includes the plural and vice versa unless it is expressly stated or unambiguously clear from the context that such is not intended.

As used herein, any term of approximation such as, without limitation, near, about, approximately, substantially, essentially and the like means that the word or phrase modified by the term of approximation need not be exactly that which is written but may vary from that written description to some extent. The extent to which the description may vary will depend on how great a change can be instituted and have one of ordinary skill in the art recognize the modified version as still having the properties, characteristics and capabilities of the word or phrase unmodified by the term of approximation. In general, but with the preceding discussion in mind, a numerical value herein that is modified by a word of approximation may vary from the stated value by ±15%, unless expressly stated otherwise.

As used herein, the use of "preferred," "presently preferred," "more preferred," "preferably," and the like refers to preferences as they exist at the time of filing of this application.

As used herein, the term "substantially complete" refers to a process that achieves an end-result as close to, and preferably at, 100% completion of whatever the process is intended to accomplish, in the present instance conversion of methane to carbon dioxide and water. Thus, when it is claimed that a catalyst of this invention is capable of completely oxidizing methane or trace methane in an exhaust stream, what is meant is that methane is undetectable in the exhaust stream after treatment using the best current analytic methodology. With regard to self-sustained combustion, completion refers to the time at which the self-sustained temperature of the combustion reaction decreases from its highest sustained level.

As used herein, "consistent catalytic activity" refers to a catalytic methane oxidation in which the light-off curve shows a steadily increasing percent conversion of methane until 100% conversion is achieved and then maintenance at the 100 percent conversion level for essentially the full useful lifetime of the catalyst in a continuous methane-containing exhaust stream or until all the methane has been converted in a batch-type waste stream.

As used herein, "methane oxidation" refers to the degradation of methane to $CO_2$ and water.

As used herein, "nanoparticulate" refers to particles in the size range of approximately 1 nm to approximately 100 nm.

As used herein, "palladium species" refers, at least, to palladium metal, $Pd^0$, palladium oxides involving Pd(II) and Pd(IV) species and $Pd—O—CeO_2$.

As used herein, "ceria" refers to cerium oxide, $CeO_2$.

As used herein, "alumina" refers to aluminum oxide, $Al_2O_3$.

As used herein, "non-hierarchical" refers to ceria and alumina that has not pre-formed onto a physical superstructure comprising pores prior to introduction of Pd species into the catalyst preparation procedure.

As used herein, "light-off" refers to the temperature at which catalytic oxidative decomposition of a material, in the present case methane, is initiated. The cool-down of the system is referred to as the "light-down" portion of the cycle.

As used herein, an "exhaust stream" refers to any gaseous effluent from any manner of device, process or procedure, which effluent contains methane including, without limitation, motor vehicle exhaust, crude oil production and processing exhaust; petroleum refining exhaust; and natural gas production and processing exhaust.

A catalyst of this invention is prepared by a one-step solution combustion synthesis (SCS) procedure in which a water soluble palladium salt, a water soluble cerium salt, a water soluble aluminum salt and an organic reductant are heated in air until auto-ignition occurs and the ensuing combustion is allowed to proceed to completion. After completion of auto-combustion, the resulting powder is calcined in air at 800° C. More specifically, $Pd(NO_3)_2$, $Ce(NO_3)_3$, $Al(NO_3)_3$ and glycine are treated as indicated above. The result is a solid-state solution of palladium/ceria supported on alumina. Examination of the resulting catalyst by x-ray photoelectron spectroscopy (XPS) revealed that the SCS process results in the formation of a solid solution in which Pd ions are doped into a ceria lattice associated with the reduction of some $Ce^{4+}$ to $Ce^{3+}$, presumably with the formation of oxygen vacancies. A comparison of the XPS spectra of SCS-prepared catalysts with that of IWI-prepared catalysts of the same chemical composition are shown in FIGS. 5-8. As can be seen, the spectra are substantially different. The Pd/ceria segregates on the surface of the alumina support whereupon the intrinsic $Ce^{3+}$ and oxygen vacancies are believed to play a major role in the resultant activity of the catalyst.

Even more specifically, the catalyst of this invention was prepared by dissolving a selected quantity of $Al(NO_3)_3.9H_2O$ in distilled water. An amount of $Pd((NO_3)_2.3H_2O$ that will result in 5 wt % Pd based on the calculated amount of $Al_2O_3$ that will result from the combustion of the selected quantity of $Al(NO_3)_3.9H_2O$ is added as is an amount of $Ce(NO_3)_3.6H_2O$ that will result in 5 wt % $CeO_2$ based on the calculated amount of $Al_2O_3$ that will result from the combustion of the selected quantity of $Al(NO_3)_3.9H_2O$. Glycine is then added such that the ratio of glycine to the total of $Al(NO_3)_3.9H_2O$, $Pd((NO_3)_2.3H_2O$ and $Ce(NO_3)_3.6H_2O$ is about 1:1.4. In a presently preferred embodiment, quantities of the above materials that will result in 5 wt % Pd and 5 wt % $CeO_2$ based on weight of $Al_2O_3$ support present in the catalyst. Once dissolved, the solution is heated until auto-combustion is initiated at which time the heat source is removed and the reaction allowed to proceed to completion in auto-thermal mode. The powder obtained is then calcined in air at 800° C. to complete the synthesis.

The material resulting from the above SCS preparation was tested as a catalyst for the oxidation of methane and was found to be extremely capable in all aspects. That is, it exhibited superior low temperature performance with a light-off temperature of approximately 200° C. followed by substantially complete oxidation at approximately 430° C. Stability of the catalyst in this temperature range was excellent, the catalyst showing no diminishment in activity throughout the test period which was approximately 60 hours. Further, when the temperature of the oxidation system was raised to approximately 800° C., no reduction in activity of the catalyst was observed for a substantial period of time, oxidation continuing unabated. Perhaps most importantly with regard to this SCS Pd-based methane catalyst, the presence of up to 15 wt % water in the exhaust stream begin treated had no observable effect on the efficiently of the catalytic process at all temperatures, 200° C. to 800° C.

The above results were confirmed by various analytical methodologies. That is, the percent conversion of methane at temperatures ranging from 200° C., the light-off temperature, to 800° C. in a temperature programmed reaction (TPRS) run at a 2° C./min ramp-up heating regime showed a smooth and rapid increase from 200° C. to about 430° C. where substantially 100% conversion occurred, a degree of conversion that was maintained all the way to 800° C. This is shown in FIG. 1.

Figure 2:
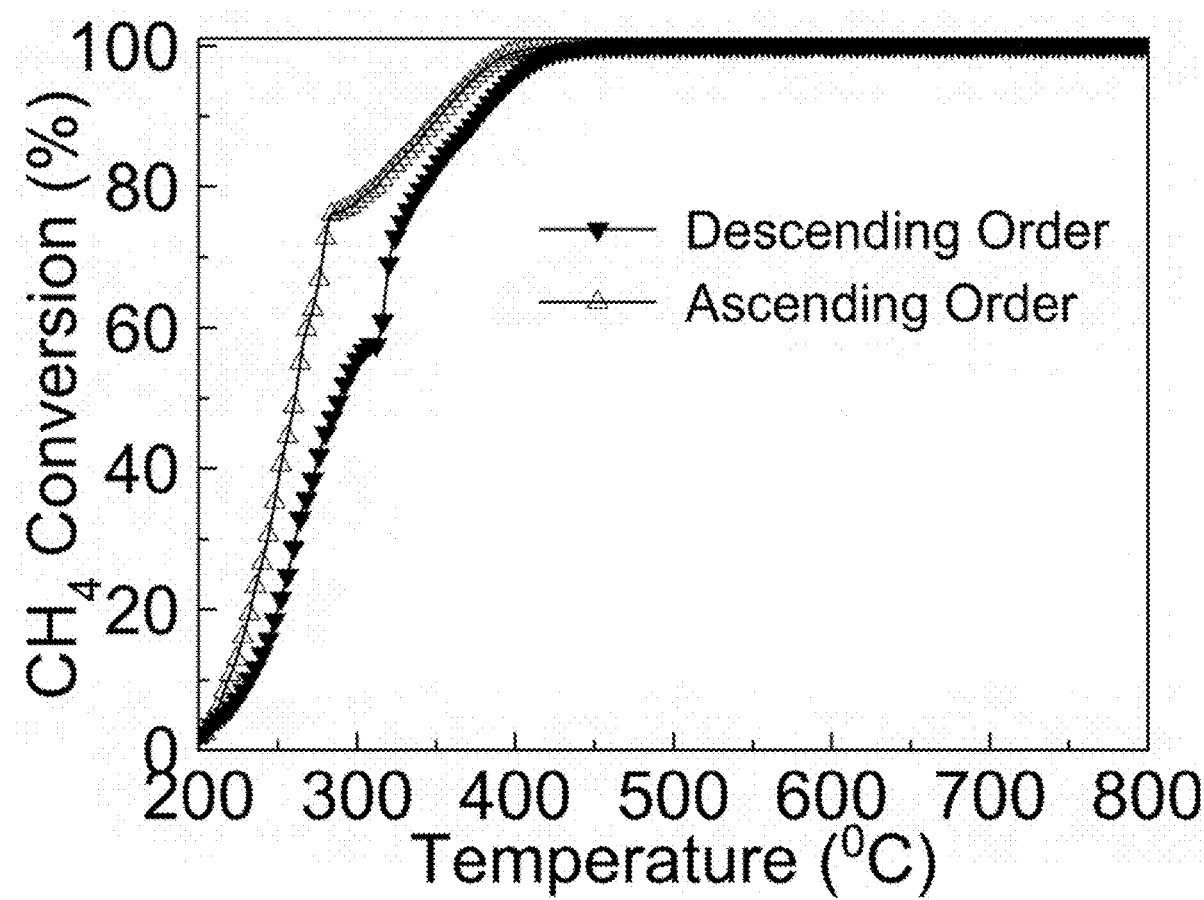
FIG. 2 shows a light-off curve graph showing the percent conversion of methane versus reaction temperature during a full heating and cooling cycle using a catalyst of this invention.

FIG. 2 shows a typical light-off curve for methane oxidation using a catalyst of this invention. As can be seen, light-off begins at approximately 200° C. and continues increasing unabatedly as the temperature is ramped up at 2° C./min to about 430° C., at which temperature substantially complete oxidation of methane is observed to occur. Oxidation remains at the 100% level from 430° C. all the way to the top temperature recorded, 800° C. The system was then cooled down, likewise at 2° C./min. during which methane oxidation remained at 100% on the graph until the temperature again reached approximately 430-450° C. and then began to drop as the temperature was reduced back to 200° C. Only a slight hysteresis was observed between the heating and cooling curves indicating that the catalyst was relatively unaffected by the time spent at 800° C., which attests to the durability of the catalyst.

Figure 3:
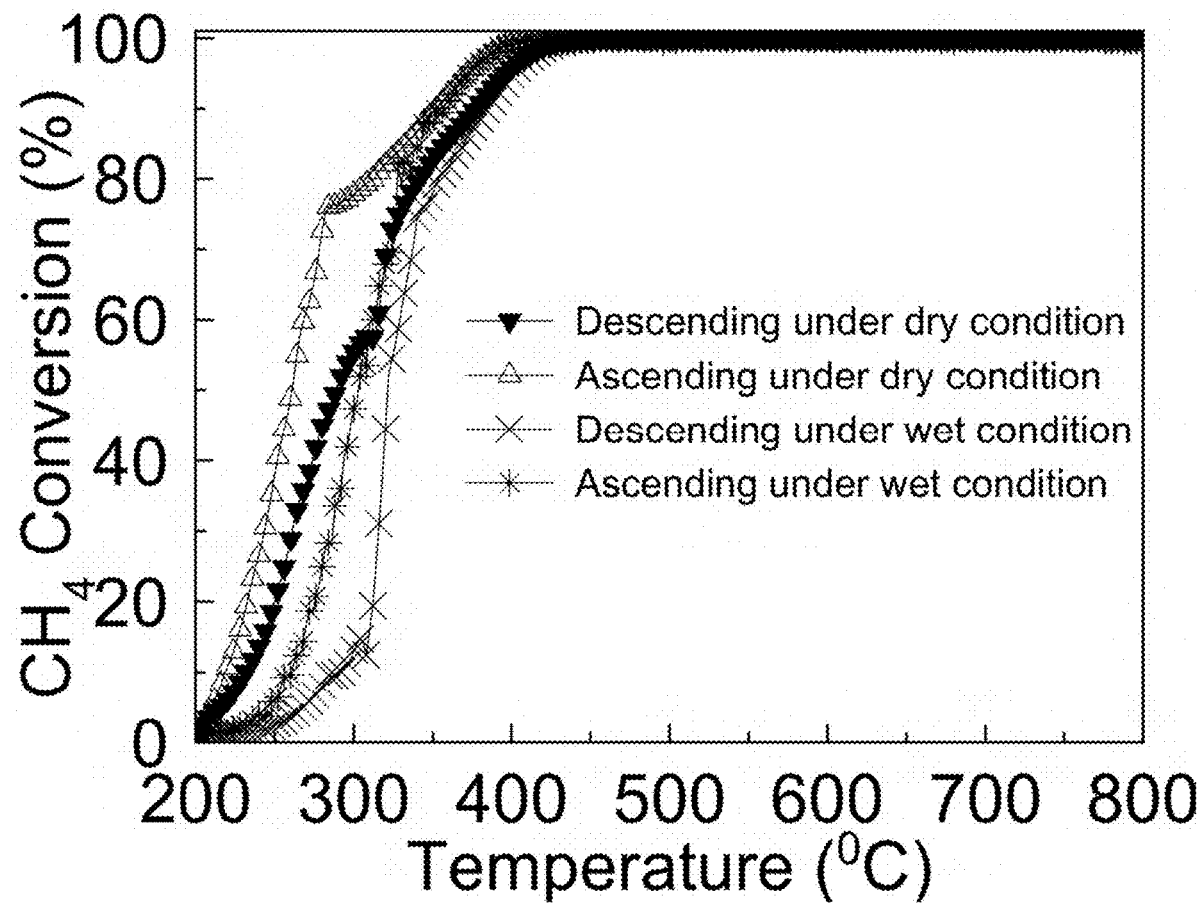
FIG. 3 shows the effect of wet-feed conditions on the percent conversion of methane using a catalyst of this invention.

FIG. 3 is another light-off curve diagram comparing the curve for methane oxidation under dry-feed conditions with the curve for methane oxidation under wet-feed condition.

The dry-feed curve, of course, follows the previously observed path: light-off at 200° C., complete combustion from 400° C. upward followed by a similar curve for the cooling down cycle with only a slight hysteresis on the downward curve. The wet-feed curves are almost mirror images of the dry-feed curves but shifted very slightly to the right. Thus, as previously stated, the catalyst of the instant invention is virtually impervious to the presence of water, at least up to 15 wt % water in a wet-feed exhaust stream.

Figure 4:
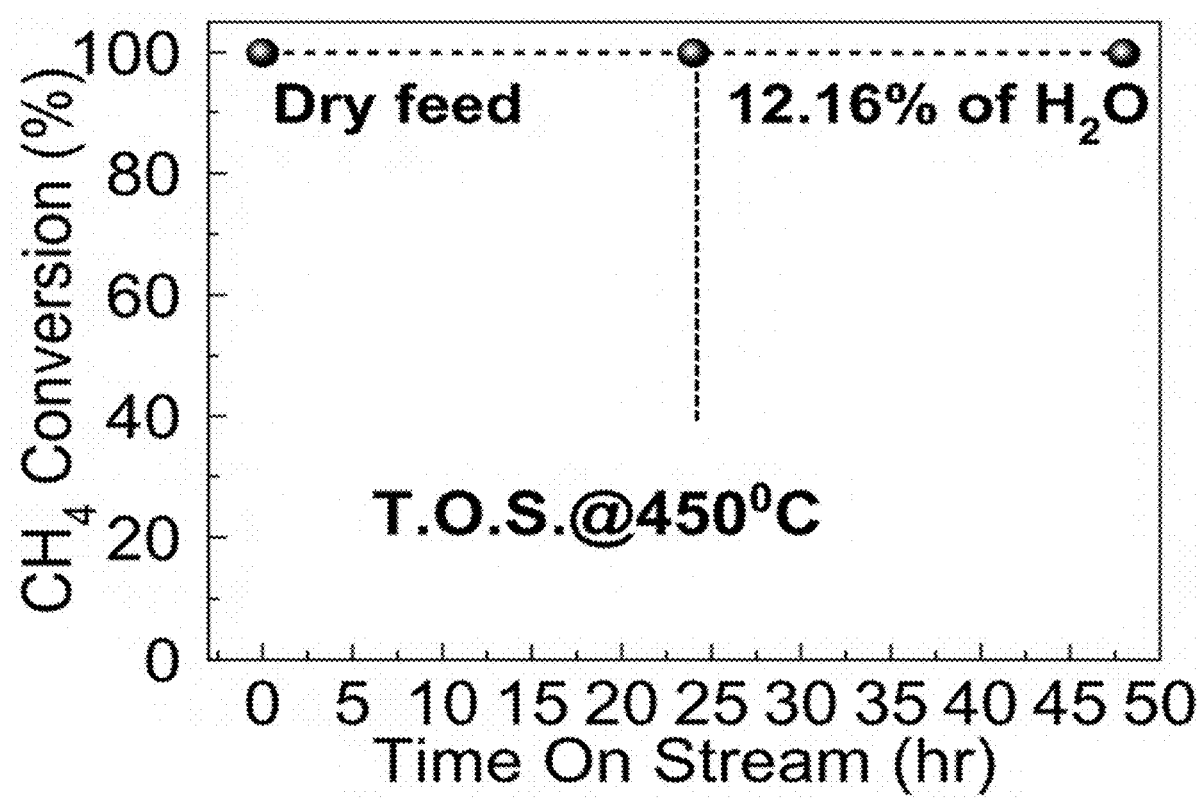
FIG. 4 shows the stability of a catalyst of this invention under dry-feed and wet-feed conditions
Figure 5:
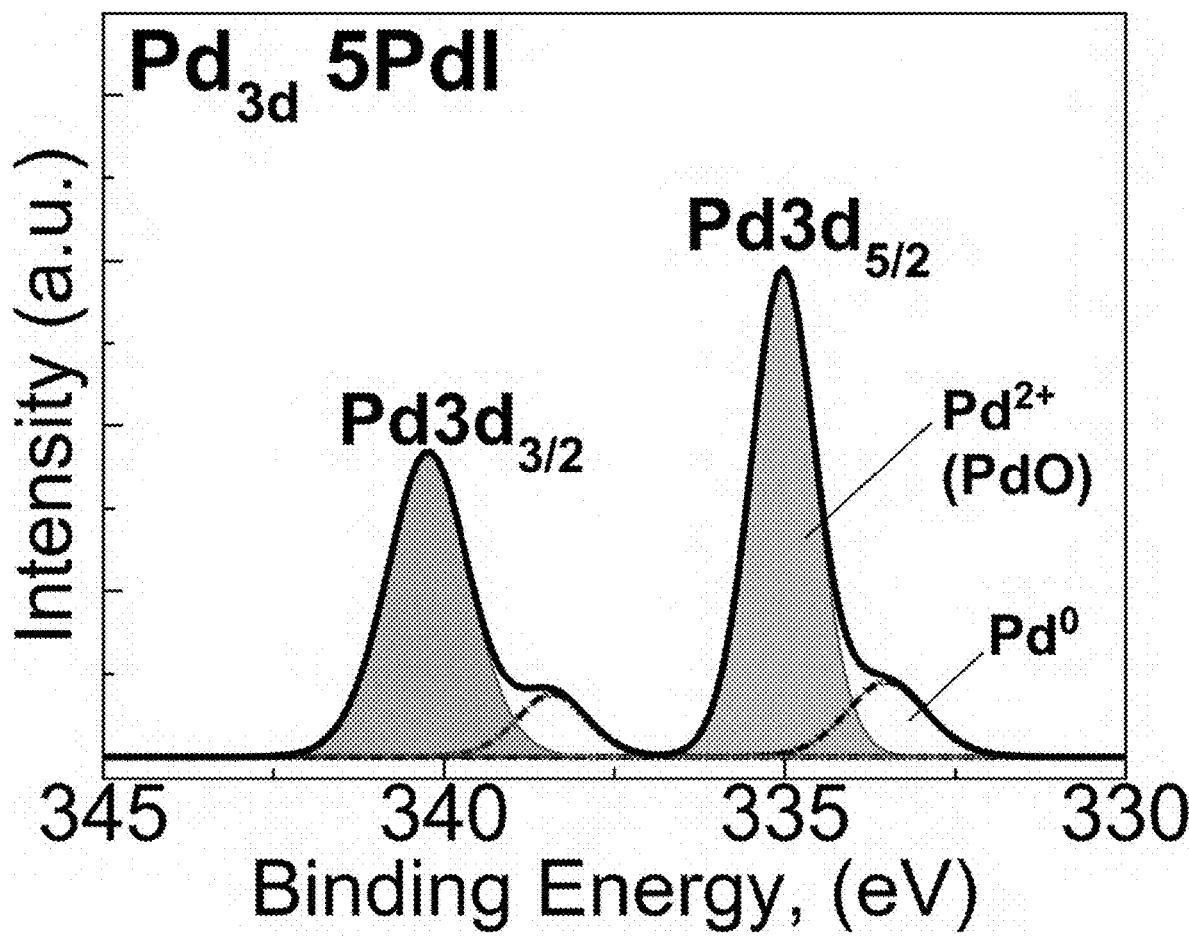
FIG. 5 shows an XPS core-level spectrum of an IWI-prepared catalyst involving $Pd_{3d}$ 5PdI sample.

FIG. 4 shows the stability of a catalyst of this invention over a 60-hour test period at 450° C. wherein the approximately 25 hours of the test were carried out under dry-feed conditions and then 12.16 wt % water was added to the feed and the test was continued for the remaining 30 hours. No change in the efficiency of the catalyst is observed in going from a dry-feed to a wet-feed condition; the conversion of methane remained as substantially complete level throughout.

EXPERIMENTAL

Catalyst Synthesis

As an example to prepare 1 g of 5 wt % Pd.5 wt % $CeO_2/Al_2O_3$ by the solution combustion synthesis (SCS) technique, 0.125 g of palladium(II) nitrate trihydrate (Pd $(NO_3)_2 \cdot 3H_2O$, BDH), 0.126 g of cerous (III) nitrate hexahydrate $(Ce(NO_3)_3 \cdot 6H_2O$, Fluka-Garantie, >99.0%) and 6.6 g of aluminum nitrate hexahydrate $(Al(NO_3)_3 \cdot 9H_2O$, Sigma Aldrich, 99.9%) precursor salts are dissolved in a 50 ml deionized water in a 250 ml capacity beaker and stirred well to get a homogeneous mixture. This was followed by the addition of 3.56 g glycine (Sigma Aldrich, 98.5%), to obtain fuel to oxidizer ratio of around 1/1.4 is added into the mixture as well. The resulting solution is heated over a hot plate for combustion. The reaction is exothermic in nature and once the combustion initiates, it proceeds in an autothermal mode without any external heating source. The synthesized nano-powder is then sintered in air by heating at a rate of 1° C./min till reaches 800° C. where stays for 3 hr, then cools down to room temperature, also, at a cooling rate of 1° C./min.

The activity of the present SCS catalyst is benchmarked with a traditional palladia/ceria/alumina catalyst. In the two cases the palladium content is fixed at 5 Wt %. The traditional catalyst is prepared via a wet impregnation method. In this procedure, prior to metal loading 0.9 g alumina (SASOL) was treated with 10 ml aqueous solution containing 0.126 g of cerous (III) nitrate hexahydrate $(Ce(NO_3)_3 \cdot 6H_2O$, Fluka-Garantie, >99.0%) solution for 5 hours followed by drying overnight at 120° C. and calcining at 800° C. 0.125 g of precursor salt $(Pd(NO_3)_2 \cdot 3H_2O$, BDH) was dissolved in deionized water and introduced to the calcined support dropwise. The resultant slurry was stirred for 6 hours followed by drying at 120° C. and calcination in a tubular furnace at 800° C. for three with 1° C. heating and cooling rates. The impregnation method catalyst is denoted as 5PdI.

Catalytic Activity

Catalytic performances for methane oxidation were investigated in a U-shaped, quartz reactor connected with online Quadrapole mass spectrometer HPR20 [Hiden Analytical]. Light-off measurements were carried out with 30 mg of catalyst at a total gas pressure of 1 atm with $CH_4$ (5% $CH_4$/Ar) to $O_2$ (1% $O_2$/Ar) v/v ratio of 2, while maintaining a Gas Hourly Space Velocity (GHSV) of ~20168.1 $mLg^{-1}h^{-1}$. The heating and cooling rates (800 to 200° C. and 200 to 800° C.) of the reactor are ramped at 2° C./min in all measurements. For experiments under wet conditions, 18% steam is introduced into the reaction mixture by passing the gases through a water saturator which was preheated to 50° C. Prior to each experiment, the catalyst is activated by treating with 5% $O_2$/Ar at 30 $mLmin^{-1}$ for 30 minutes at 500° C. This step is followed by flushing the catalyst bed with 20 $mLmin^{-1}$ argon for 20 minutes and raising the furnace temperature to 800° C. to record the light-off curves. Light off curves are taken under heating and cooling conditions at rates of +2 and −2K $min^{-1}$, respectively. The $CH_4$% conversion is calculated using equation 1;

$$CH4 \text{ conversion } (\%) = \left[\frac{CH_4(in) - CH_4(out)}{CH_4(in)}\right] \times 100$$

For the wet-feed study, the reactant gas mixture was bubbled through a saturator heated to 50° C.

XPS Analysis of SCS Method Leading to Formation of PD-O—Ce Solid Solution

Figure 6:
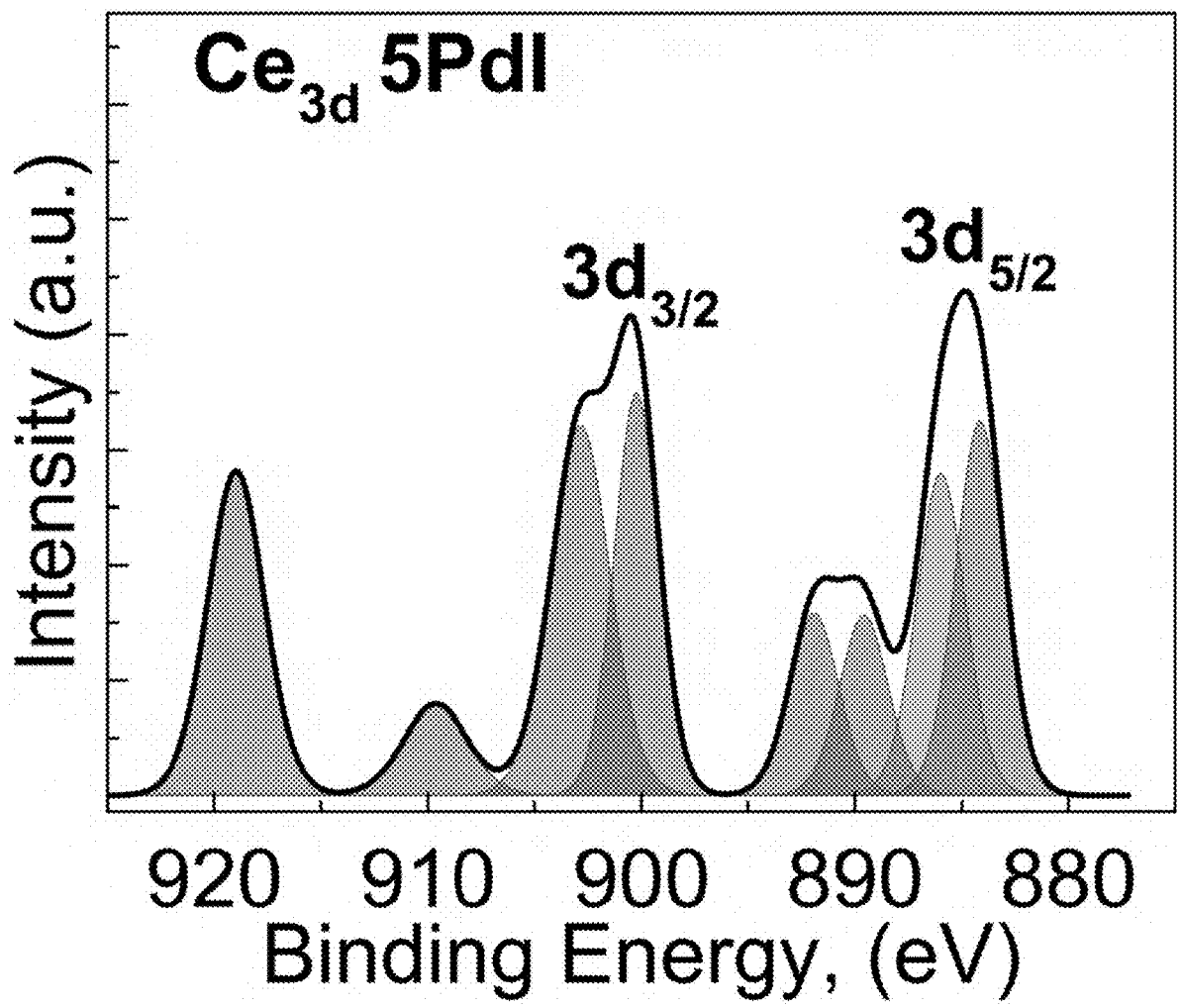
FIG. 6 shows another XPS core-level spectrum of an IWI-prepared catalyst involving 5PdI Ce3d.

The surface chemical composition and distribution of palladium species laying on the surface of the calcined catalysts were investigated by means of XPS measurement. The Pd3d spectra (FIG. 5) of 5PdI (prepared by impregnation method) catalyst exhibited the presence of $Pd^{2+}$ (PdO) and metallic $Pd^0$. The XPS spectrum is characterized by two doublet Pd3d peaks: the binding energies 335.1 eV and 340.3 eV were assigned to PdO, whereas the second doublet at binding energies at 333.4 eV and 338.3 eV were assigned to $Pd^0$. As can be seen in FIG. 6, in the XPS spectra f the Ce(3d) core level region of the 5PdI the $Ce3d_{3/2}$ and $3d_{5/2}$ appears at 920 eV and 882 eV with well separated spin-orbit components ($\Delta$=18.6 eV) having multiple splitting that are typical of $Ce^{4+}$ in $CeO_2$.

Contrary to 5PdI, the XPS spectra of 5P5CA (prepared by solution combustion synthesis method) catalyst exhibited much broader and less symmetric peaks suggesting a larger heterogeneity in its palladium environments. The XPS of the Pd(3d) core level region are presented in FIG. 7. Six Pd(3d5/2,3/2) peak doublets were observed. The binding energies at 335.4 and 336.8 eV were assigned to Pd(3d5/2) in Pd metal and PdO, respectively. The third doublet with its Pd(3d5/2) peak at 338.8 eV was assigned to Pd ions which are much more ionic than those associated with PdO. This highly ionized Pd ions of the samples prepared by the SCS can be assigned to Pd ions which are inserted into the ceria lattice forming pallida/ceria solid solution. The appearance of the six Pd XPS doublets, comparing to only four Pd XPS doublets for the impregnation catalyst, strongly indicated the formation of Pd/ceria solid solution as has already been noticed in previous literature (Colussi et al., 2015; Colussi et al., 2009; Priolkar et al., 2002). In the theoretical study by Scanlon et al. (Scanlon, Morgan, & Watson, 2011), it was predicted that the ground state structure of Pd doped $CeO_2$ is a square planar with Pd ions having $d^8$ configuration; meaning that $Pd^{2+}$ rather than $Pd^{4+}$ is the predominant oxidation state in the Pd—O—Ce solid solution linkage. These $Pd^{2+}$ ions have greater ionic property than the $Pd^{2+}$ ions of normal PdO. Therefore, it is plausible to assign the high energy Pd XPS doublet at 338.8 eV to the strongly ionized $Pd^{2+}$ ions inserted into the Pd—O—Ce solid solution linkage.

On the basis of XPS results, it is reasonable to conclude that, in contrast to conventional method, during the solution combustion synthesis (SCS), Pd is inserted into the ceria lattice forming non stoichiometric Pd—O—Ce solid solution which is segregated on the surface of the alumina support. This explanation is in agreement with conclusions from the experimental work by Colussi et al. (Colussi et al., 2015; Colussi et al., 2009) and Priolkar et al. (Priolkar et al., 2002) as well as the theoretical prediction by Scanlon et al. (Scanlon et al., 2011). The insertion of Pd ion into the ceria lattice must be associated with oxygen vacancy formation; consequently, with the generation of $Ce^{3+}$ ions. Indeed, XPS showed the formation of $Ce^{3+}$ ions in all catalysts prepared by the SCS method, FIG. 8, though, these catalysts are formed under oxidation condition during the SCS. It is worth mentioning that the XPS of the catalyst 5PI, prepared by the impregnation, FIG. 6 does not show any peaks corresponding to $Ce^{3+}$ species.

What is claimed:

1. A catalyst for methane oxidation, comprising:
   nanoparticulate palladium species in the size of 1 nm to 100 nm;
   non-hierarchical ceria; and
   non-hierarchical alumina;
   wherein the catalyst is characterized by:
      light-off at approximately 200° C.;
      complete oxidation at approximately 430° C.;
      stability up to at least 800° C.;
      consistent catalytic activity to at least 800° C.;
      consistent catalytic activity for exhaust streams containing up to 15 wt % water to at least 800° C.;
      a Pd—O—Ce solid solution segregated on the surface of the alumina support;
      an X-ray photoelectron spectroscopy (XPS) of the Pd(3d) core level region that comprises doublets at least at the following binding energies: 335.4 eV, 336.8 eV, and 338.8 ev; and
   wherein the catalyst comprises 5 wt % nanoparticulate palladium species and 5 wt % ceria, both based on the quantity of alumina present.

2. The catalyst of claim 1, wherein the catalyst has a BET surface area of at least 88 $m^2/g$.

Figure 7:
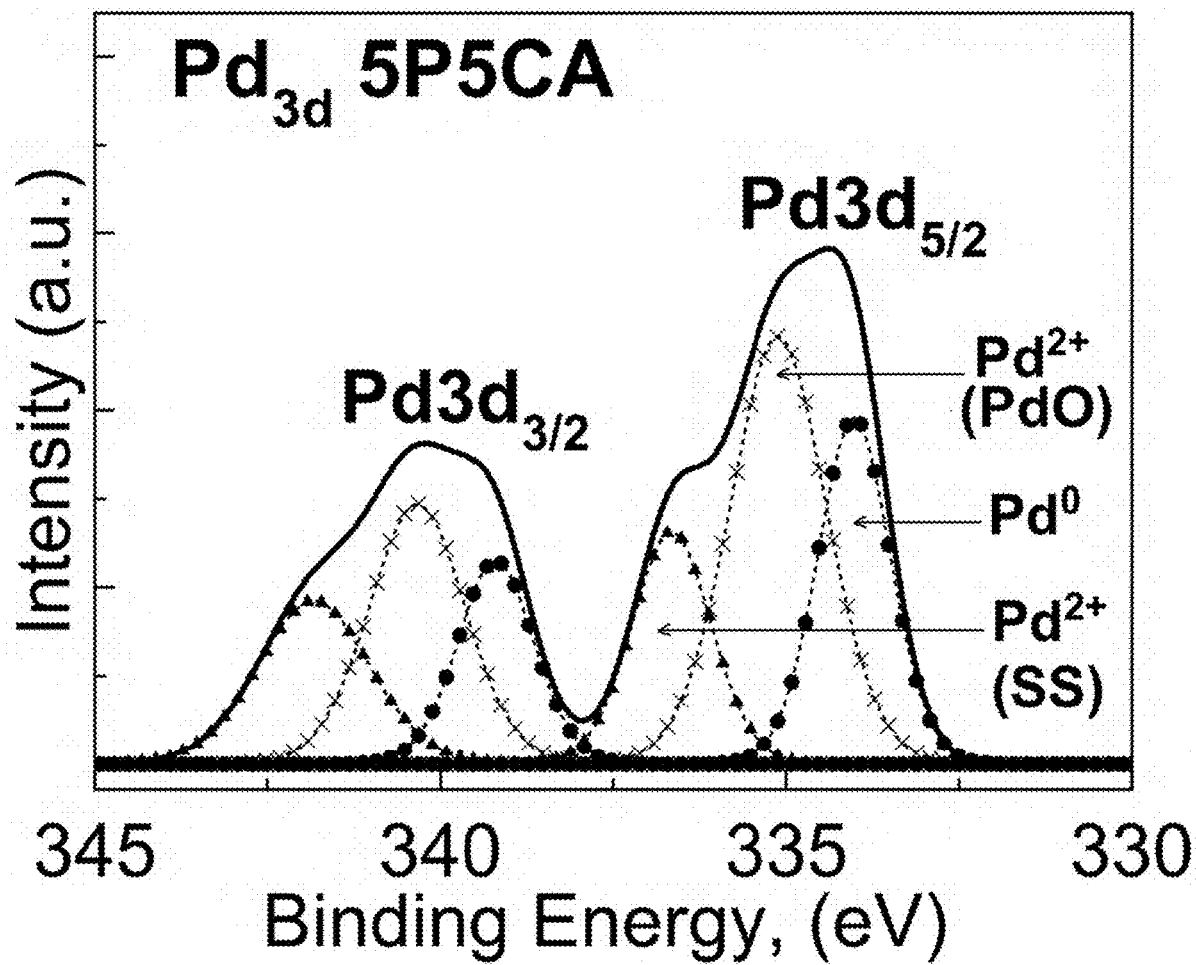
FIG. 7 shows an XPS core-level spectrum of an SCS-prepared catalyst involving $Pd_{3d}$ 5P5CA.

3. The catalyst of claim 1, having an XPS of the Pd(3d) core level region as shown in FIG. 7.

Figure 8:
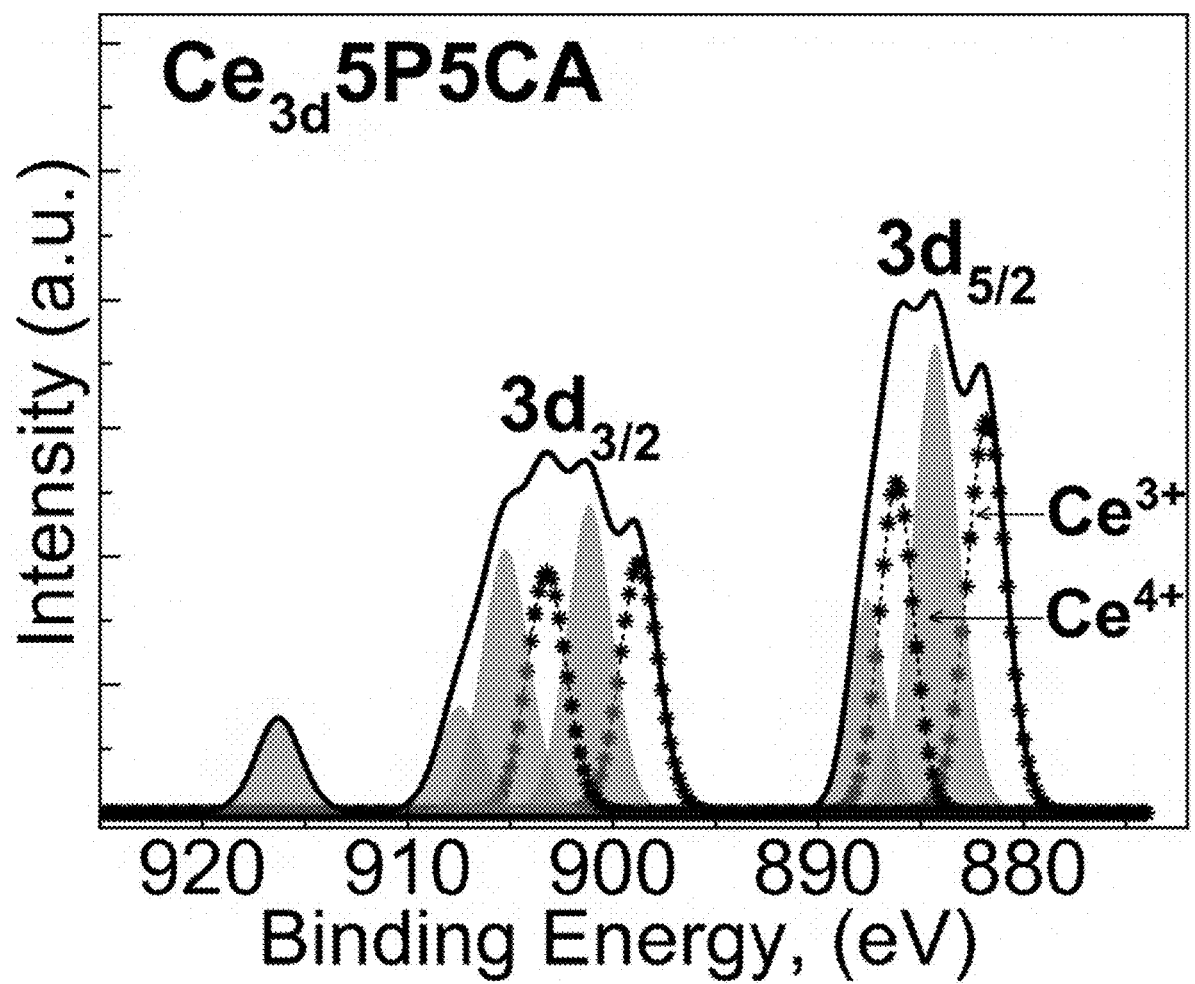
FIG. 8 shows an XPS core-level spectrum of an SCS-prepared catalyst involving Ce3d 5P5CA.

4. The catalyst of claim 1, having an XPS of the Ce(3d) core level region as shown in FIG. 8.

* * * * *